Patented May 28, 1929.

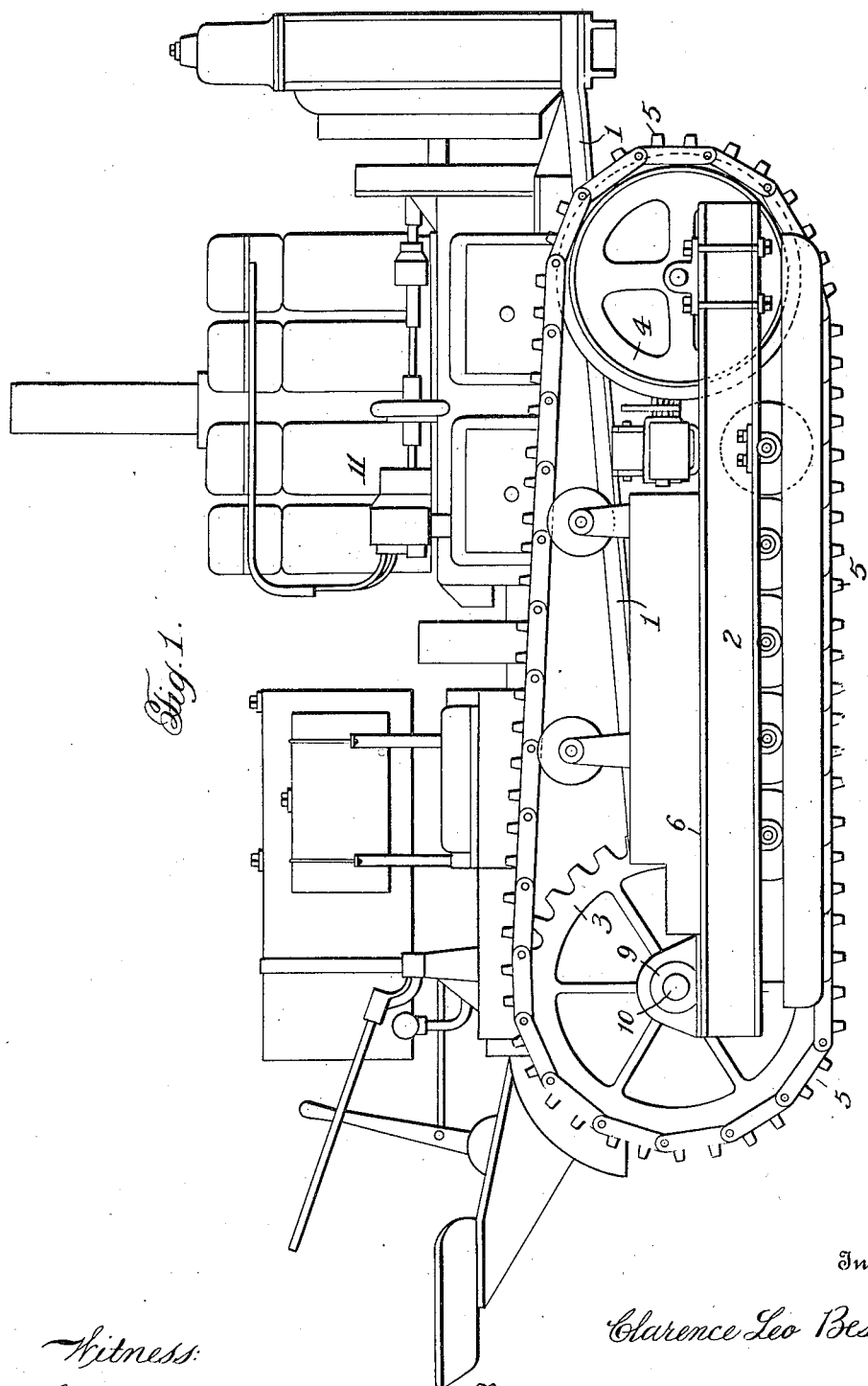

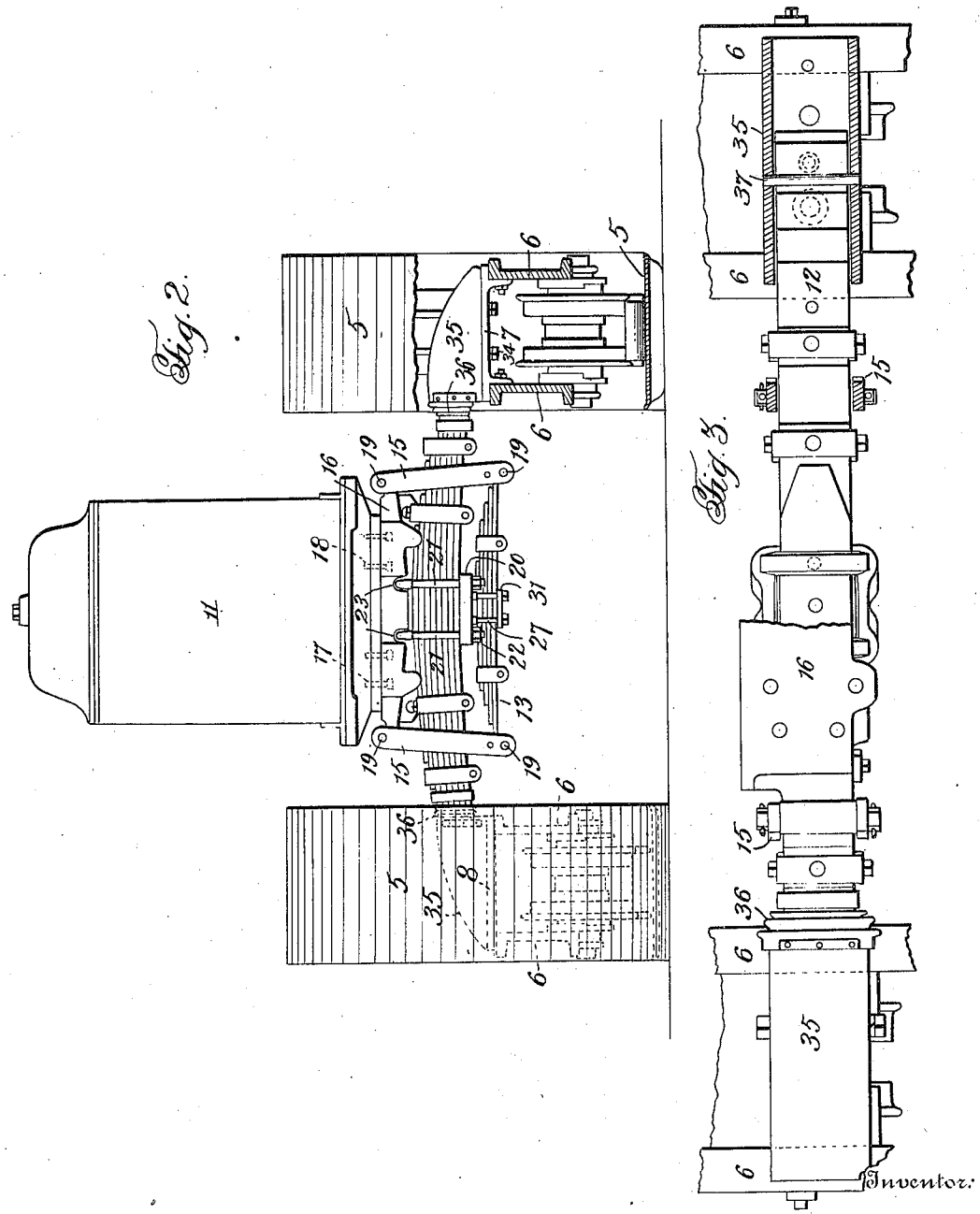

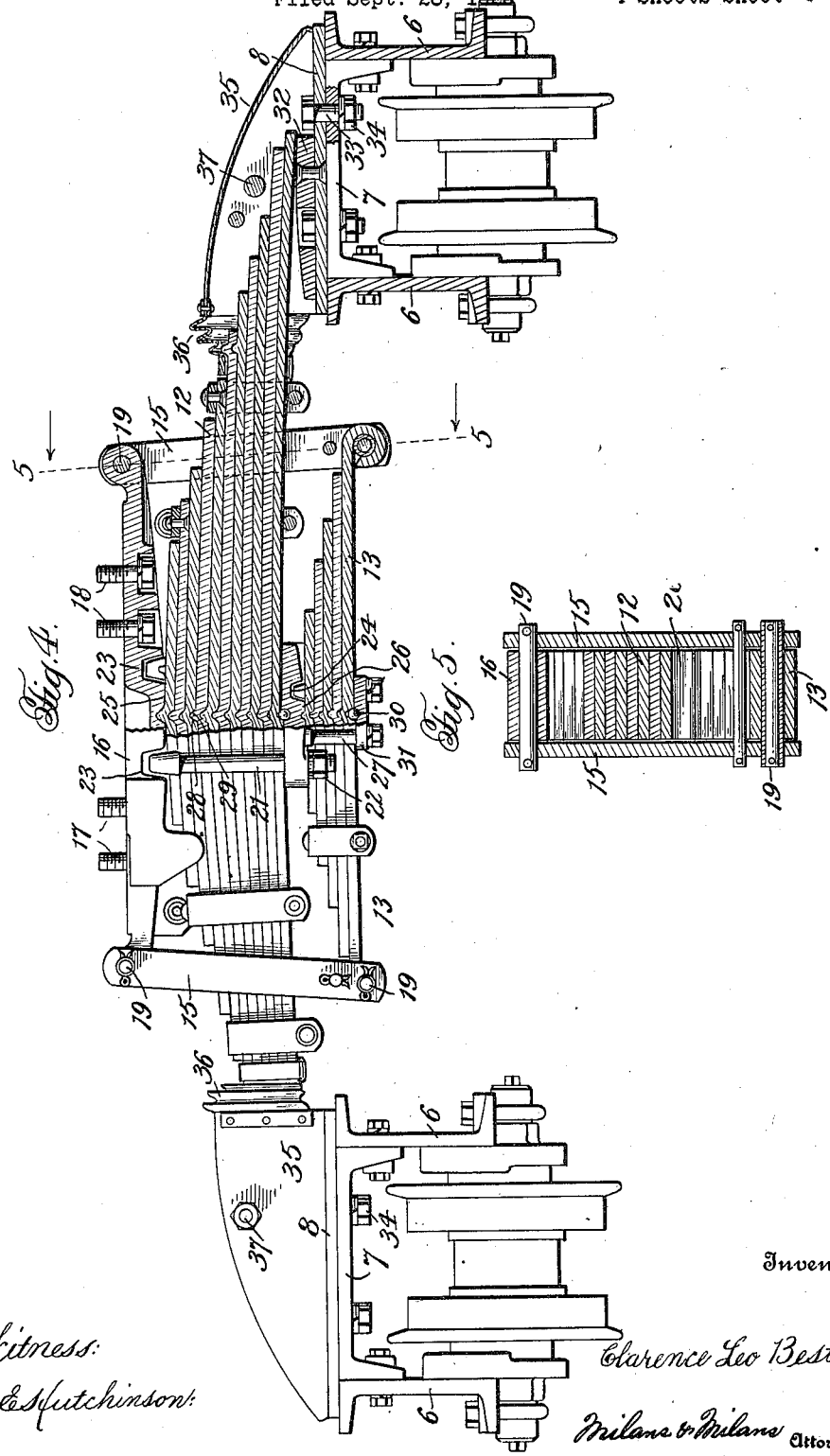

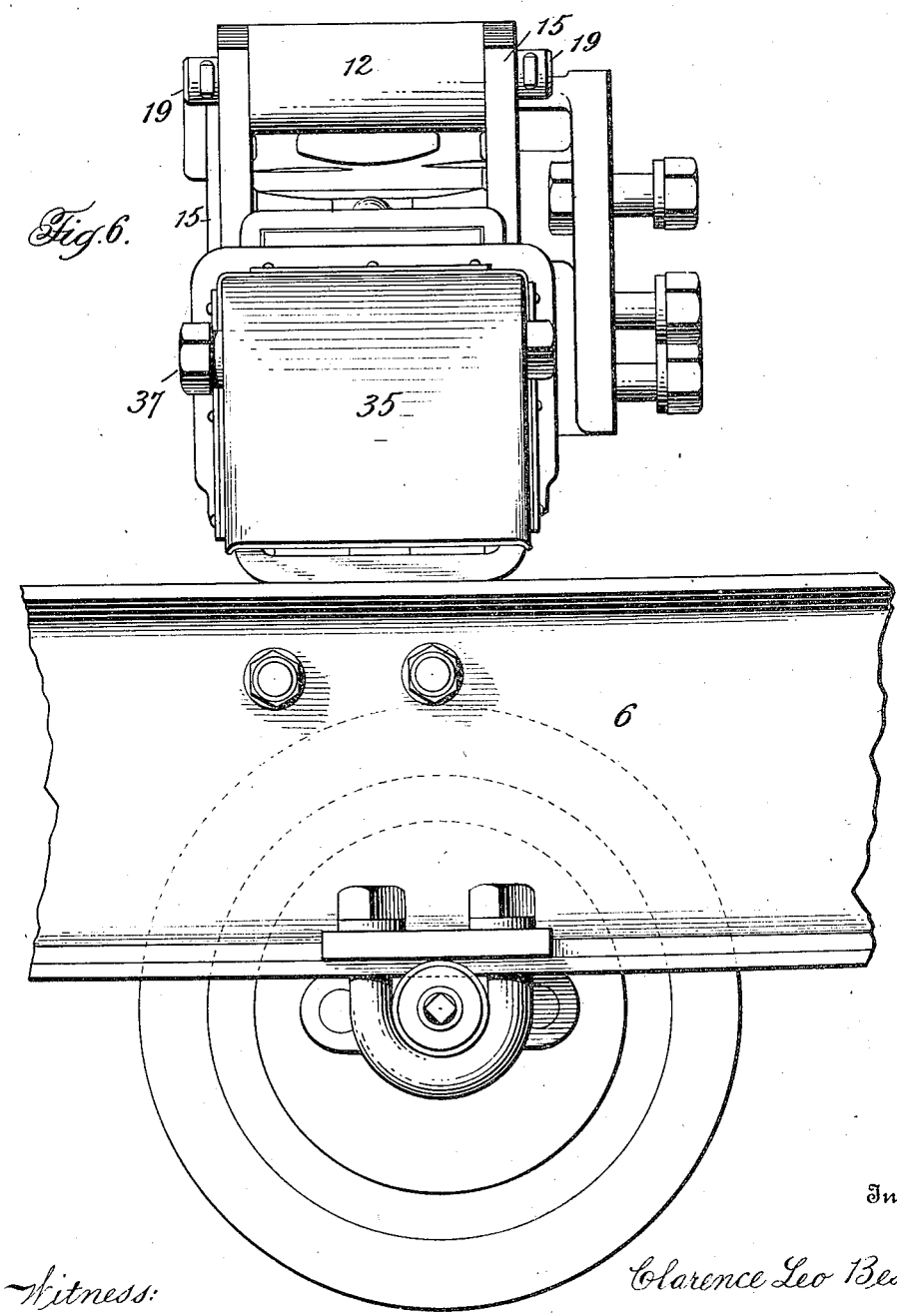

1,715,055

UNITED STATES PATENT OFFICE.

CLARENCE LEO BEST, OF SAN LEANDRO, CALIFORNIA, ASSIGNOR TO CATERPILLAR TRACTOR CO., OF SAN LEANDRO, CALIFORNIA, A CORPORATION OF CALIFORNIA.

TRACKLAYING TRACTOR.

Application filed September 28, 1925. Serial No. 59,170.

This invention relates to improvements in track laying tractors, and more particularly to an improved resilient equalizer bar suspension for supporting the main frame upon the tractor trucks.

The object of the invention is to provide an improved equalizer bar suspension of a simple, efficient, durable nature that while providing for the required independent oscillatory movement of the trucks and the cushioning of the main frame from shocks, will provide for better functioning of the trucks as regards their oscillatory movement relatively to each other and remaining in operative engagement with the ground, and for a more steady, satisfactory operation of the machine over uneven or hilly ground.

The invention, with other objects and advantages thereof, and the particular construction, combinations, and arrangements of parts comprising the same, will be understood from the hereinafter contained detailed description, when considered in connection with the accompanying drawings, forming part hereof, and illustrating one embodiment of the invention.

In the drawings:

Figure 1 is a side elevation of a tractor constructed in accordance with the present invention.

Fig. 2 is a front elevation, with parts shown in section.

Fig. 3 is a detail top plan of the equalizer bar and portions of the trucks.

Fig. 4 is a detail front elevation of the equalizer bar and portions of the trucks, with parts shown in vertical section.

Fig. 5 is a transverse section on the line 5—5 of Figure 4.

Fig. 6 is a detail view, the equalizer bar being shown in end elevation and a portion of one of the trucks in side elevation.

The invention comprehends an improved equalizer bar suspension comprising a resilient equalizer bar for supporting the main frame upon the tractor trucks, said equalizer bar consisting of a leaf spring having its ends resting upon opposite truck frames free for lateral play transversely relatively thereto, and being yieldably held centrally of its ends to the main frame for limited rocking movement relatively thereto. More particularly the invention contemplates holding the main equalizer leaf spring member to the main frame by a supplemental leaf spring supported at its ends by links connected with the main frame and having its central part engaging the equalizer leaf spring centrally of the ends thereof, together with interfitting parts on the main frame, the main equalizer bar leaf spring, and the supplemental leaf spring member, providing for a limited rocking movement of the main equalizer bar leaf spring relatively to the main frame.

While a specific embodiment of the invention is illustrated in the drawings, a construction that has been found satisfactory in practice, it will of course be understood that changes and variations in the particular construction shown and the embodiment of the invention in other forms, as will appeal to those skilled in the art and falling within the scope of the appended claims may be practiced without departing from the spirit of the invention.

Referring to a detail description of the particular embodiment of the invention illustrated in the drawings, 1 designates the main frame of the machine, and 2 are the tractor trucks extending along opposite sides thereof. Each tractor truck comprises a truck frame, a rear driving sprocket 3, a front idler wheel 4 and an endless track 5, the truck frames being shown as comprising spaced parallel side channels 6 and upper channel bars 7 and top plate 8 suitably secured together. The truck frames are pivotally connected at their rear portions to the rear portion of the main frame 1 so that the forward portions of the trucks are free to swing vertically independently of each other, said truck frames having journals 9 engaging an axle 10 suitably secured to the rear portion of the main frame. The driving sprockets 3 are journaled upon the axle 10 and power is transmitted thereto through conventional transmission mechanism (not shown) from the engine 11 mounted on the main frame 1.

In accordance with the present invention the main frame 1 is supported at its forward part upon the forward portions of the tractor trucks by an equalizer bar in the form of a laminated or leaf spring 12 having its ends resting upon opposite truck frame portions for lateral sliding play relatively thereto and yieldably held centrally of its ends to the main frame 1 for limited rocking movement relatively thereto.

The means for yieldably holding the spring equalizer bar 12 to the main frame for limited rocking movement comprises a supplemental leaf spring 13 and pivotal link connections between the end portions of said supplemental spring 13 and the main frame 1, and supporting the supplemental spring 13 with its central part in supporting contact with the under side of the spring equalizer bar 12 centrally of the ends thereof and pressing the same against the main frame 1, said supplemental leaf spring 13 being of less length than the spring equalizer bar 12 and disposed at the under side of the same in the vertical plane thereof. An attaching part for the links 15 and a bearing for the central upper face portion of the spring equalizer bar 12 is provided on the main frame 1. The attaching part and bearing referred to advantageously take the form of a separate bracket member 16 detachably secured to the under side of the main frame 1 by bolts and nuts 17, 18, the link connections 15 comprising pairs of link members connected by pivot pins 19 to the outer ends of the bracket 16 and the ends of the supplemental spring 13. A spacing and bearing block 20 is provided between the opposing central portions of the spring equalizer bar 12, and the supplemental spring 13, said block 20 being shown secured to the spring equalizer bar by clips 21 and nuts 22. The bearing on the bracket member 16 and the upper central part of the spring equalizer bar 12, and the bearing block 20 and the central part of the supplemental spring 13, are provided respectively with interfitting portions, which cooperate to limit the oscillatory movement of the spring equalizer bar 12. In the particular construction shown, said interfitting portions are conveniently formed by recessed portions 23, 24, at either side of the central bearing portions 25, 26, on the bracket 16 and bearing block 20 respectively, and the upper portions of clips 21 and 27 respectively on the spring equalizer bar 12 and supplemental spring 13, the upper portions of the clips 21, 27 normally projecting into said recessed portions 23 and 24, in spaced relation with the walls thereof, as shown.

The leaf spring members of the spring equalizer bar 12 and the supplemental spring 13 are shown provided with projecting portions 28 and recesses 29 at opposite sides centrally of their ends, the projections 29 and recesses 28 of one leaf spring member interfitting respectively with the recess 28 and projecting portions 29 of another spring member, and at the bottom of the springs 12, 13, steel bearing balls 30 are provided engaging the recesses 29 in the bottom leaves of said springs, the balls 30 respectively engaging seats formed in the upper faces of the bearing block 20 and a plate 31 held by the clips 27 against the under face of the supplemental spring 13.

The tractor trucks are provided with seats 32 for the ends of the spring equalizer bar 12, said seats 32 having inwardly inclined faces, as shown, upon which the ends of the spring equalizer bar 12 are adapted to slide. The seats 32 are shown in the form of separate plates secured to the top plates 8 of the truck frames by bolts and nuts 33, 34. Housings are provided to exclude dirt and mud from the seats 32 and the ends of the spring equalizer bar 12, said housings comprising rigid housing portions 35 fixedly mounted on the top plates 8 of the truck frames, and flexible housing portions 36 secured to end portions of the spring equalizer bar 12 and the inner ends of the rigid housing portions 35 and forming continuations thereof. 37 designates pins mounted upon and extending transversely of the rigid housing parts 35 to prevent disengagement of the ends of the spring equalizer bar 12 from the seats 32.

Any suitable means, not shown, may be employed to maintain the proper spacing and alinement of the tractor trucks, for instance the strut and rear bracing means disclosed in my Patent No. 1,661,649 dated March 6, 1928.

The special equalizer bar suspension, hereinbefore set forth, consisting of a leaf spring having its ends resting upon opposite truck frames free for lateral play relatively thereto, and yieldably held centrally of its ends to the main frame for limited rocking movement relatively thereto, provides for the required amount of independent vertical oscillation of the trucks and the cushioning of the main frame against shocks, at the same time, with only a limited rocking movement of the equalizer bar relatively to the main frame, the machine operates in a more steady satisfactory manner over uneven or hilly ground, the operative engagement of the trucks with the ground being better maintained and the trucks functioning more efficiently, the particular spring equalizer bar suspension being especially advantageous for the smaller type of tractor for use in work in vineyards, orchards, etc., on side hills.

What I claim is:

1. The combination with the main frame of a tractor and a pair of endless track frames arranged at opposite sides thereof and pivotally connected at opposite portions thereof with the main frame to permit independent vertical swinging movement of said endless track frames, of a resilient equalizer bar for supporting the main frame upon the endless track frames, said equalizer bar consisting of a leaf spring having its ends resting upon opposite endless track frames at points spaced from the pivotal connections of the endless track frames with the main frame free for movement transversely relatively thereto, resilient means yieldably holding said resilient equalizer bar centrally of its ends to the main frame for limited rocking movement relatively thereto, and stop portions on the endless track frames for preventing disengagement of the ends of the equalizer bar leaf spring from the endless track frames.

2. The combination with the main frame of a tractor and a pair of endless track frames arranged at opposite sides thereof and pivotally connected at opposite portions thereof with the main frame to permit independent vertical swinging movement of said endless track frames, of a resilient equalizer bar for supporting the main frame upon the endless track frames, said equalizer bar consisting of a leaf spring and having its ends resting upon opposite endless track frames at points spaced from the pivotal connections of the endless track frames with the main frame free for movement transversely relatively thereto, and resilient means yieldably holding said resilient equalizer bar intermediate its ends to the main frame for limited rocking movement relatively thereto.

3. The combination with the main frame of a tractor and a pair of endless track frames arranged at opposite sides thereof and pivotally connected at their rear portions with the rear portion of the main frame to permit independent vertical movement of the forward portions of the endless track frames, of a resilient equalizer bar consisting of a leaf spring having its ends resting upon forward portions of opposite endless track frames, the ends of the equalizer bar being free for transverse movement relatively to the endless track frames, and resilient means yieldably holding said equalizer bar to the main frame for limited rocking movement relatively thereto.

4. The combination with the main frame of a tractor and a pair of endless track frames arranged at opposite sides thereof and pivotally connected at opposite portions thereof with the main frame to permit independent vertical swinging movement of said endless track frames, of a resilient equalizer bar for supporting the main frame upon the endless track frames, said equalizer bar consisting of a leaf spring having its ends resting upon opposite endless track frames at points spaced from the pivotal connections of the endless track frames with the main frame free for movement transversely relatively thereto, and means yieldably holding said resilient equalizer bar intermediate its ends to the main frame for limited rocking movement relatively thereto, said means including a supplemental leaf spring member connected at its ends with the main frame.

5. The combination with the main frame of a tractor and a pair of endless track frames arranged at opposite sides thereof and pivotally connected at opposite portions thereof with the main frame to permit independent vertical swinging movement of said endless track frames, of a resilient equalizer bar for supporting the main frame upon the endless track frames, said equalizer bar consisting of a leaf spring having its ends resting upon opposite endless track frames at points spaced from the pivotal connections of the endless track frames with the main frame free for movement transversely relatively thereto, and means yieldably holding said resilient equalizer bar intermediate its ends to the main frame for limited rocking movement relatively thereto, said means including a supplemental leaf spring member, and pivotal link connections between end portions of said supplemental leaf spring member and the main frame.

6. The combination with the main frame of a tractor and a pair of endless track frames arranged at opposite sides thereof and pivotally connected at opposite portions thereof with the main frame to permit independent vertical swinging movement of said endless track frames, of a resilient equalizer bar for supporting the main frame upon the endless track frames, said equalizer bar consisting of a leaf spring having its ends resting upon opposite endless track frames at points spaced from the pivotal connections of the endless track frames with the main frame free for movement transversely relatively thereto, and means yieldably holding said resilient equalizer bar intermediate its ends to the main frame for limited rocking movement relatively thereto, said means including a supplemental leaf spring member disposed below the main equalizer bar leaf spring, and pivotal link connections between end portions of the supplemental leaf spring member and the main frame.

7. The combination with the main frame of a tractor and a pair of endless track frames arranged at opposite sides thereof and pivotally connected at opposite portions thereof with the main frame to permit independent vertical swinging movement of said endless track frames, of a resilient equalizer bar for supporting the main frame upon the endless track frames, said equalizer bar consisting of a leaf spring having its ends resting upon opposite endless track frames at points spaced from the pivotal connections of the endless track frames with the main frame free for movement transversely relatively thereto, and means yieldably holding said resilient equalizer bar intermediate its ends to the main frame for limited rocking movement relatively thereto, said means including a supplemental leaf spring member disposed in the vertical plane of the main equalizer bar leaf spring and connected at its end portions with the main frame.

8. The combination with the main frame of a tractor and a pair of endless track frames arranged at opposite sides thereof and pivotally connected at opposite portions thereof with the main frame, of a resilient equalizer bar for supporting the main frame upon the endless track frames, said equalizer bar consisting of a leaf spring having its ends resting upon opposite endless track frames at points spaced from the pivotal connections of the endless track frames with the main frame free for movement transversely relatively thereto, and means yieldably holding said resilient equalizer bar intermediate its ends to the main frame for limited rocking movement relatively thereto, said means including a supplemental leaf spring member disposed below and in the vertical plane of the main equalizer bar leaf spring in supporting contact at its central part with the central part thereof, and pivotal link connections between end portions of the supplemental leaf spring member and the main frame.

9. The combination with the main frame of a tractor and a pair of endless track frames at opposite sides thereof and pivotally connected at opposite portions thereof with the main frame, of a resilient equalizer bar for supporting the main frame upon the endless track frames, said equalizer bar consisting of a leaf spring having its ends resting upon opposite endless track frames at points spaced from the pivotal connections of the endless track frames with the main frame free for movement transversely relatively thereto, and means yieldably holding said resilient equalizer bar intermediate its ends to the main frame for limited rocking movement relatively thereto, said means including a bracket, means for detachably securing the bracket to the main frame, said bracket having a bearing portion for engagement by a central portion of the main equalizer bar leaf spring member, a supplemental leaf spring member disposed below and in the vertical plane of the main equalizer bar leaf spring in supporting contact at its central part with the central part thereof, and pivotal link connections between end portions of the supplemental leaf spring member and said bracket.

10. The combination with the main frame of a tractor and a pair of endless track frames arranged at opposite sides thereof and pivotally connected at opposite portions thereof with the main frame, of a resilient equalizer bar for supporting the main frame upon the endless track frames, said equalizer bar consisting of a leaf spring having its ends resting upon opposite endless track frames at points spaced from the pivotal connections of the endless track frames with the main frame free for movement transversely relatively thereto, and means yieldably holding said resilient equalizer bar intermediate its ends to the main frame for limited rocking movement relatively thereto, said means including a bearing on the main frame for the central upper part of the main equalizer bar leaf spring, said bearing having recesses in its under side and said main equalizer bar leaf spring having projecting portions to cooperate with said recesses, a supplemental leaf spring member arranged below and in the vertical plane of the main equalizer bar leaf spring with its central part in supporting contact with the central part of the main equalizer leaf spring, and pivotal link connections between end portions of the supplemental leaf spring member and the main frame.

11. The combination with the main frame of a tractor and a pair of endless track frames arranged at opposite sides thereof and pivotally connected at opposite portions thereof with the main frame, of a resilient equalizer bar for supporting the main frame upon the endless track frames, said equalizer bar consisting of a leaf spring having its ends resting upon opposite endless track frames at points spaced from the pivotal connections of the endless track frames with the main frame free for movement transversely relatively thereto, and means yieldably holding said resilient equalizer bar intermediate its ends to the main frame for limited rocking movement relatively thereto, said means including a bearing on the main frame for the central part of the main equalizer bar leaf spring, a supplemental leaf spring disposed below and in the plane of the main equalizer bar leaf spring in supporting contact at its central part with the central part of the main equalizer bar leaf spring, cooperating interfitting portions on the said bearing, the main equalizer bar leaf spring and the supplemental leaf spring, and pivotal link connections between the end portions of the supplemental leaf spring and the main frame.

12. The combination with the main frame of a tractor and a pair of endless track frames arranged at opposite sides thereof and pivotally connected at opposite portions thereof with the main frame, of a transversely disposed inwardly inclined seat on each endless track frame at a point spaced from the pivotal connections of the endless track frames with the main frame, a resilient equalizer bar for supporting the main frame upon the endless track frames, said equalizer bar consisting of a leaf spring having its ends slidably resting upon said inclined seats of the endless track frames, and resilient means yieldably holding said resilient equalizer bar intermediate its ends to the main frame for limited rocking movement relatively thereto.

13. The combination with the main frame of a tractor and a pair of endless track frames arranged at opposite sides thereof and pivotally connected at opposite portions thereof with the main frame, of a transversely disposed inwardly inclined seat on each endless track frame at a point spaced from the pivotal connections of the endless track frames with the main frame, a resilient equalizer bar for supporting the main frame upon the endless track frames, said equalizer bar consisting of a leaf spring having its ends slidably resting upon said inclined seats of the endless track frames, resilient means yieldably holding said resilient equalizer bar intermediate its ends to the main frame for limited rocking movement relatively thereto, and rigid housing parts on the endless track frames for the ends of the equalizer bar leaf spring, and flexible housing portions connected with the end portions of the main equalizer bar leaf spring and the said rigid housing parts and forming continuations thereof.

In testimony whereof I hereunto affix my signature.

CLARENCE LEO BEST.